Patented June 20, 1939

2,163,466

UNITED STATES PATENT OFFICE 2,163,466

PROCESS FOR THE EXTRACTION OF ALKALI HYDRATES OR CARBONATES AND OF ALUMINUM HYDROXIDE FROM THE DOUBLE SILICATES OF ALKALI AND ALUMINA

Remo Szyia Opatowski and Piero Adamoli, Milan, Italy

No Drawing. Application June 2, 1937, Serial No. 146,112. In Italy June 12, 1936

5 Claims. (Cl. 23—143)

This invention has for its object some improvements in the process for the extraction of alkali hydrates and carbonates and of alumina from the double silicates of the alkali metals and aluminum.

The extraction of alkali from the natural silicates containing same and particularly the obtainment of the potassium hydrate and carbonate and of the alumina from the double silicates of potassium and aluminum (leucites and felspar) has been performed in several ways. The different processes as hitherto proposed present, however, remarkable drawbacks, both from the technical and economical viewpoint. These drawbacks may be mainly resumed as follows:

The acid processes (e. g. the treatment of the leucite with hydrochloric acid) present the serious inconvenience that the silicate by decomposing sets some gelatinous silica free, which renders the filtration of the dissolved part very difficult. Moreover, the acid solutions are strongly soaked with iron, which is always present in the ores and the elimination of which is very difficult and expensive.

The alkaline processes hitherto employed are based on the decomposition of the potassium and aluminum silicates by means of the oxides or other compounds of the alkali earths that are reducible to oxide by calcination. These processes present the inconvenience that it is necessary to effect the decomposition of the silicates at very high temperatures, and consequently by heavy fuel consumption and, as the mix must be generally heated up to its melting point, a rapid deterioration of the furnace lining ensues. According to other processes the decomposition is effected at substantially lower temperatures, especially in the cases in which alkali is added; these processes present however the inconvenience that the alkali aluminate solutions are soaked with important silica amounts. Furthermore, by all these processes the soluble components obtained must be generally extracted in an autoclave under pressure, in order to promote the complete solution of the alkali aluminate.

Other processes aim to extract only the potash, leaving in the residue the whole alumina.

The process forming the object of the present invention differs from the above-mentioned alkali processes in that it is based on the fact that the silicates of alkali and aluminum are easily decomposed by the heat at substantially lower temperatures (under 1000° C.) than by the other alkali processes and without arriving to the melting point of the materials, provided they are thoroughly mixed with carbonates and/or oxides and/or hydrates of the alkaline earths in the presence of fluorides whereby the amount of alkaline earth oxide shall be such as to combine the whole silica but not in such excess as to combine the alumina; and shall not be in excess of 3 mols for each silica mol contained in the silicates. Thus, in practice in the case of the leucite, by employing limestone as the alkaline earth compound, for each 100 parts of leucite about 250 parts and not over 300 parts of limestone should be employed.

Thus proceeding an aggregate is obtained which is not melted, can be easily powdered and contains as soluble alkali aluminate practically the whole alkali of the silicate, as its volatilisation has been avoided due to relatively low calcining temperature. This technically pure aluminate can be easily extracted by lixiviation with water without any need to subject the same to treatments under pressure in an autoclave. The solid insoluble residue containing practically the whole silica of the silicate presents the double advantage to be in an easily filtrable form and to be further employable to other purposes as it will be better seen from the following example:

100 p. b. w. of leucite having a $K_2O$ content of about 18.5% are finely pulverised and intimately mixed with 250 parts of limestone and 25 parts of fluorite, both pulverised. The calcination of the mixture is effected in a rotating kiln or in a muffle furnace for about one hour and thirty minutes at a temperature of about 930° C. The calcined mixture, which is only slightly clogged but not melted, after cooling and pulverisation is introduced into an iron lixiviator fitted with a stirring device and lixiviated with warm water (about 80° C.) during 10 to 15 minutes. After this time the extraction of the potassium aluminate is practically complete. The solution is filtered, preferably on a vacuum filter, and the insoluble residue is washed with warm water, whereby the dilute solution thus obtained is employed for further lixiviations.

By suitably operating, a concentrated potassium aluminate solution is obtained. The solution is practically free from iron and silica, which remain in the insoluble residue and can be further treated as usually in order to obtain the final products. Thus for instance by treating the said concentrated potassium aluminate solution at 60 to 80° C. with carbon dioxide the aluminum hydrate precipitates in such a form as to render its filtration and washing easy. This hydrate, after a suitable washing and calcination may be utilised for the production of aluminum, while the potassium carbonate remains in solution. This solution may be either directly evaporated in order to obtain the potassium carbonate, or also causti-fied with lime and successively evaporated in order to obtain potassium hydrate. By operating as outlined from 100 kgs. of commercial leucite either 24 kgs. of potassium carbonate or about 21.5 kgs. of melted caustic potash at 90% are obtained. The process as described by way of example may be industrially performed with remarkable technical and economical advantages by working in a continuous manner and by operating so as to reduce to a minimum the heat losses. Thus for instance the calcined mixture discharged from the rotating furnace or kiln may be introduced, while still hot, directly, i. e. without being previously powdered, in the diluted solution obtained by washing the insoluble residue of the preceding batch. Also the lixiviation of the calcined mixtures may be effected in a continuous cycle by employing the usual lixiviators (for instance of the Dorn type), fitted with a stirring device, and also the filtration may be effected on continuous rotating vacuum filters (for instance of the Oliver type).

For the precipitation of the alumina from the potassium aluminate solution the carbon dioxide that is developed in the kiln during the calcinating operation may be directly utilised. The solid residue left back after the lixiviation of the potassium aluminate from the calcined mixture has a composition which is like that of the Portland cement and may be utilised for the production of artificial cement, by adding thereto preferably 3 to 5% of Fe2O3 (for instance pyrites ashes). This utilization is very advantageous in that owing to the previous calcination in the kiln the fuel consumption for the production of the clinker is reduced to about one half of the usual amount required for the production of the same quantity of cement from the usual raw materials.

From the preceding it is apparent that the above described process presents a number of advantages with regard to the former processes, as all operations are effected at atmospherical pressure, without any need to employ acids or other expensive reagents. Furthermore, owing to the not excessively elevated calcining temperatures (under 1000° C.) the process may be carried out with a reduced fuel consumption in comparison with the other known processes for the decomposition of silicates by means of limestone or lime at higher temperatures. Another advantage is that owing to the moderate temperature of decomposition of the silicate the volatilization of a part of the alkali is avoided, which volatilization would otherwise lower the total amount of the aluminate formed.

Furthermore, the necessity of expensive recuperation plants for the volatilized alkali is avoided.

Moreover, all operations of filtration are easily performed, as the silica, that is left back in the pulverulent residue, is in a solid noncolloidal form.

Another technical advantage is that, owing to the fact that the mixture is not melted, the lining of the kiln is not attacked and therefore for this lining usual refractory materials may be employed, while the lixiviators, filtrators and other equipment for the treatment of the decomposed materials may be made of iron.

We claim:

1. In a process for the extraction of alkalis of the class consisting of alkali hydrates and carbonates and of aluminium hydroxide from the double silicates of alkali and alumina, the steps of finely pulverizing the said silicates, intimately mixing same with finely pulverized carbonates and fluorides of the alkaline earth metals, whereby for each silica mol contained in the silicate not over 3 mols of alkaline earth metal carbonate and an amount of not less than 33 and not over 25 parts by weight of fluoride are employed, calcining for some time the said intimately mixed materials in an oven or kiln at a temperature under the melting point of the mixture so as to promote the formation of alkali aluminates, extracting the calcined materials from the oven or kiln and lixiviating such calcined materials with water so as to extract the soluble alkali aluminates formed during the calcination from the insoluble residue.

2. In a process for the extraction of alkalis of the class consisting of alkali hydrates and carbonates and of aluminium hydroxide from the double silicates of alkali and alumina, the steps of finely pulverizing the said silicates, intimately mixing same with finely pulverized hydroxides and fluorides of the alkaline earth metals, whereby for each silica mol contained in the silicate not over 3 mols of alkaline earth metal hydroxide and an amount of not less than 3 and not over 25 parts by weight of fluoride are employed, calcining for some time the said intimately mixed materials in an oven or kiln at a temperature under the melting point of the mixture so as to promote the formation of alkali aluminates, extracting the calcined materials from the oven or kiln and lixiviating such calcined materials with water so as to extract the soluble alkali aluminates formed during the calcination from the insoluble residue.

3. In a process for the extraction of alkalis of the class consisting of alkali hydrates and carbonates and of aluminium hydroxide from the double silicates of alkali and alumina, the steps of finely pulverizing the said silicates, intimately mixing same with a finely pulverized mixture of carbonates and hydroxides and with fluorides of the alkaline earth metals, whereby for each silica mol contained in the silicate not over 3 mols of alkaline earth metal, a finely powdered mixture of carbonates and hydroxides of the alkaline earth metals and an amount of not less than 3 and not over 25 parts by weight of fluoride are employed, calcining for some time the said intimately mixed materials in an oven or kiln at a temperature under the melting point of the mixture so as to promote the formation of alkali aluminates, extracting the calcined materials from the oven or kiln and lixiviating such calcined materials with water so as to extract the soluble alkali aluminates formed during the calcination from the insoluble residue.

4. In a process for the extraction of alkalis of the class consisting of alkali hydrates and carbonates and of aluminium hydrate from the alkali and aluminium silicates, the steps of finely pulverizing the said silicates, mixing same with finely powdered compounds of the alkaline earth metals in an amount that is sufficient to combine with such alkali earth metals the whole silica of the alum, silicate, but insufficient to further combine substantial amounts of alumina in the form of calcium aluminate under the action of the heat, adding from 3 to 25% by weight of fluoride of the alkaline earth metals, heating the mixture for one or two hours in a kiln at a temperature under 1000° C., extracting the heated non-melted mixture from the kiln, and lixiviating same with water.

5. A process for the extraction of potassium carbonate and aluminium hydroxide from leucite, comprising pulverizing the said leucite, adding thereto for each 100 parts by weight of leucite with a $K_2O$ contents of 18% about 250 parts of limestone and 25 parts of fluorite, both finely pulverized, and intimately mixing said materials, calcining said materials in a kiln for one hour and thirty minutes at 930° C., extracting the calcined materials from the kiln, separating the potassium aluminate from the insoluble residue by lixiviating the calcined materials with hot water at atmospheric pressure, treating the potassium aluminate solution with carbon dioxide, separating the precipitated aluminium hydroxide from the mother liquor, and evaporating this latter to dry so as to obtain solid potassium carbonate.

REMO SZYIA OPATOWSKI.
PIERO ADAMOLI.